J. C. SCHLEICHER.
AIRSHIP.
APPLICATION FILED MAY 4, 1916.
1,232,614.
Patented July 10, 1917.
5 SHEETS—SHEET 5.
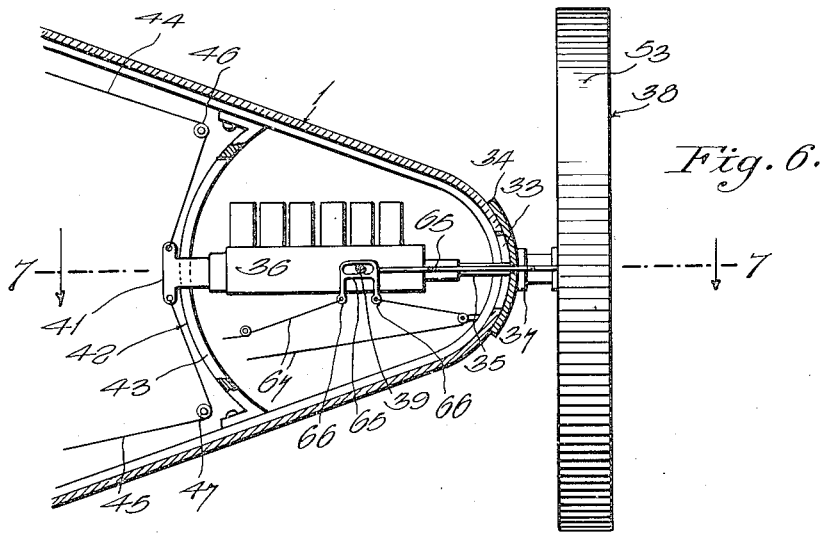
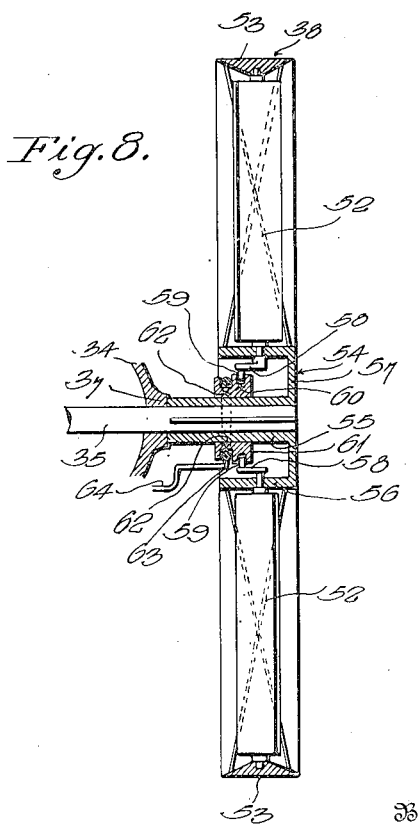
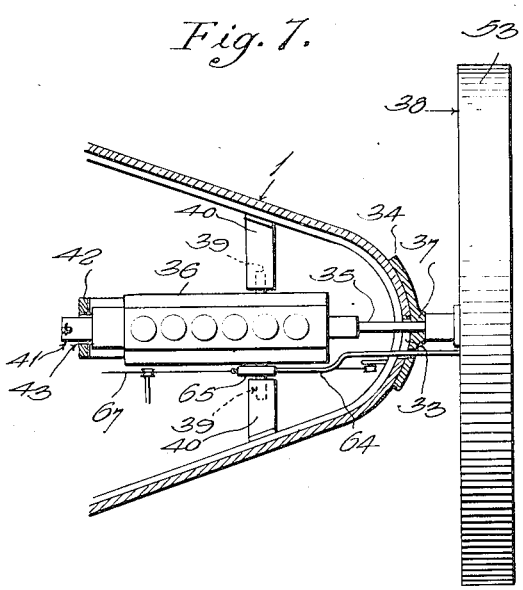
Inventor
J. C. Schleicher
Attorneys

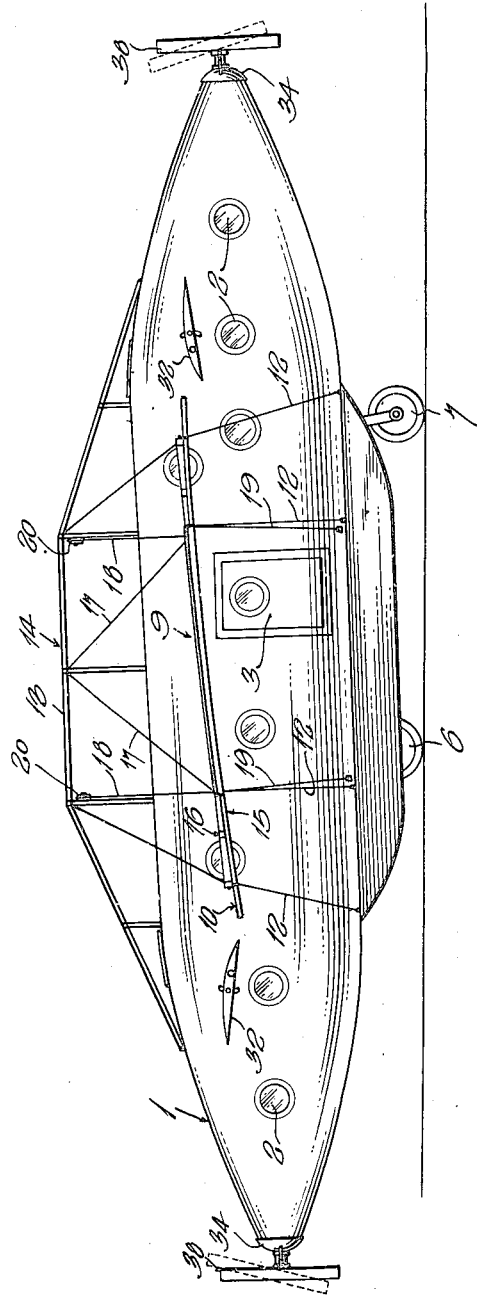

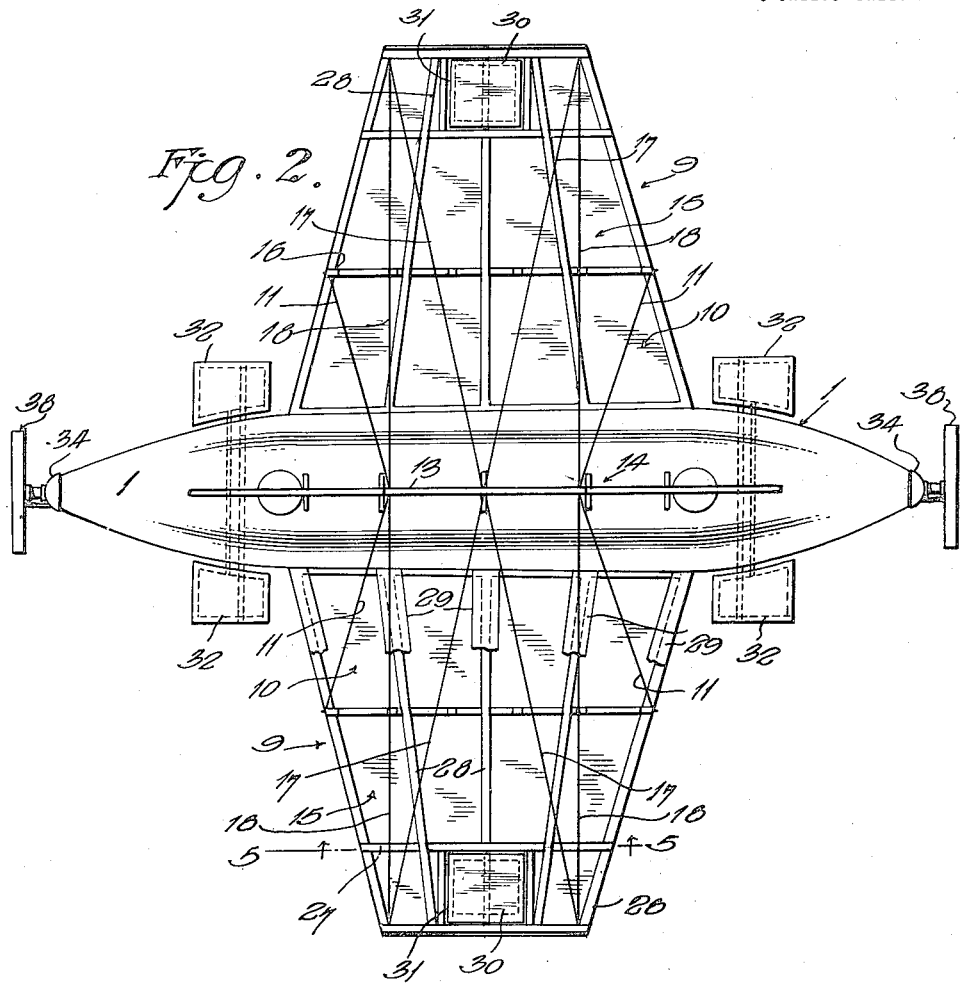

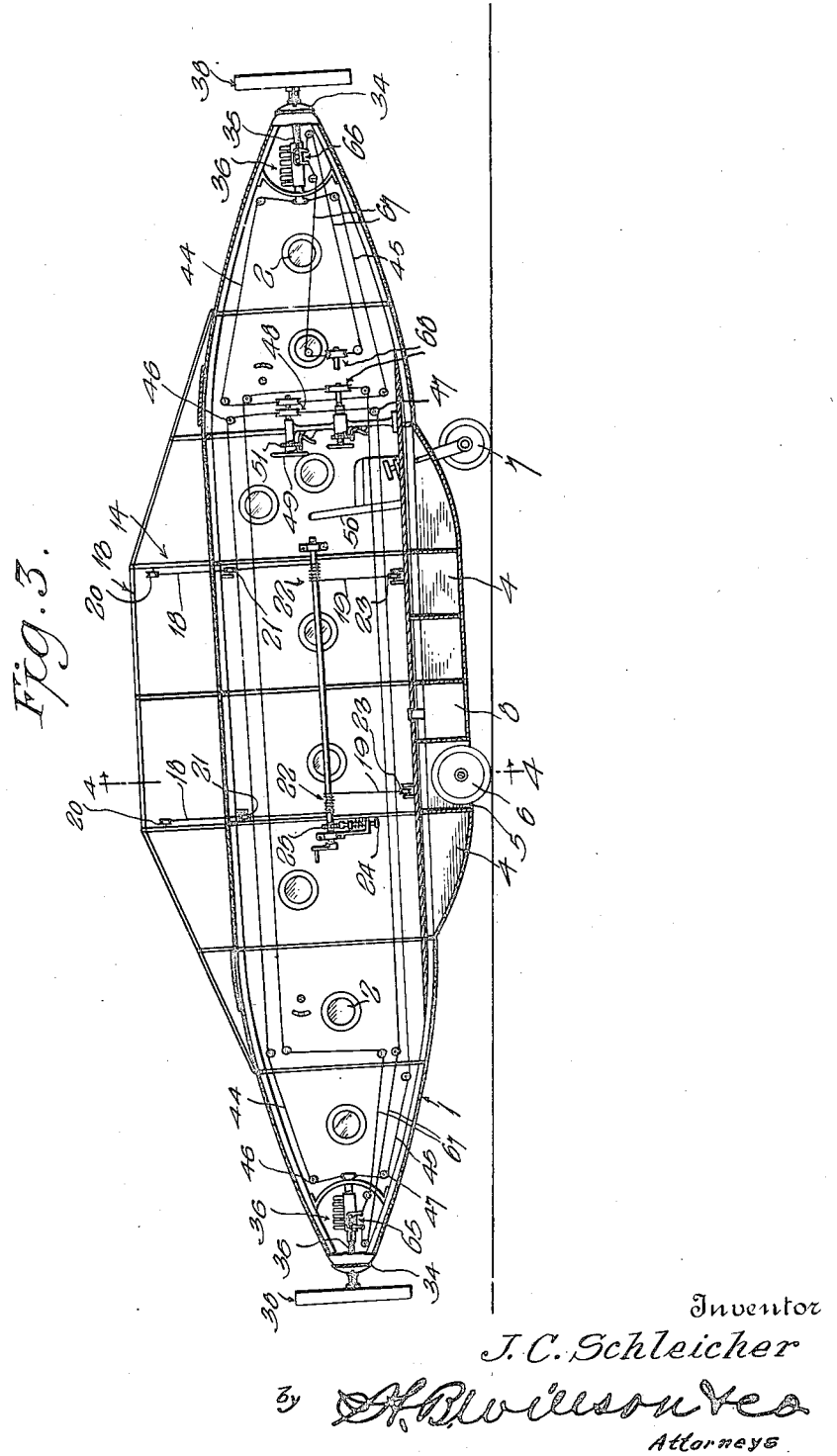

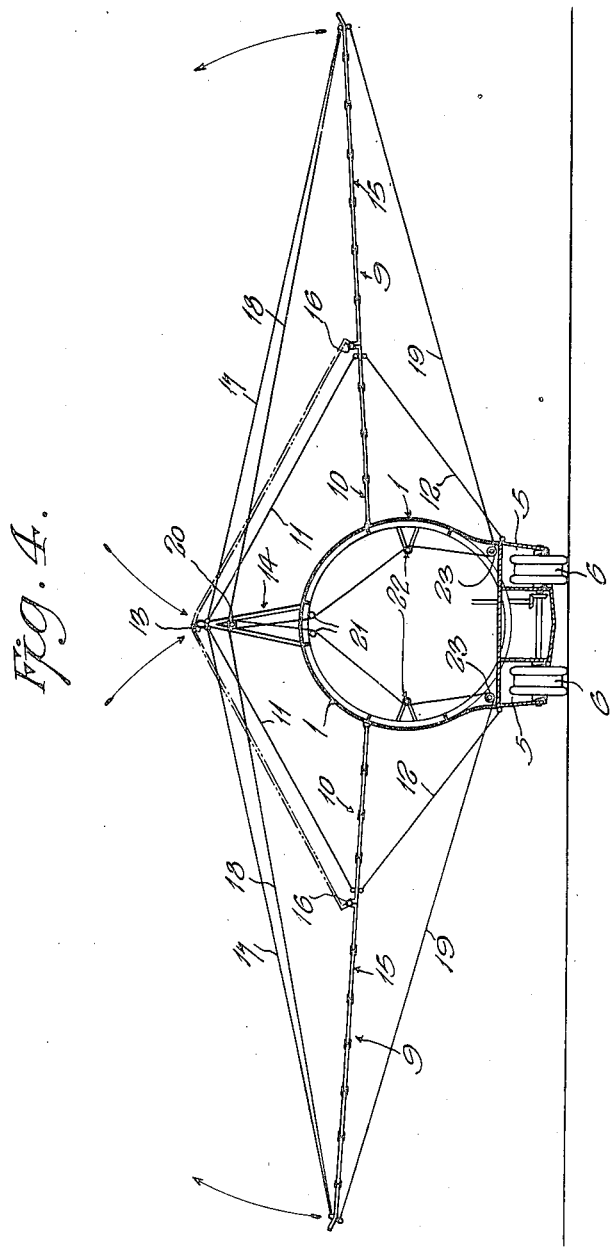

UNITED STATES PATENT OFFICE.

JOHN C. SCHLEICHER, OF MOUNT VERNON. NEW YORK.

AIRSHIP.

1,232,614. Specification of Letters Patent. Patented July 10, 1917.

Application filed May 4, 1916. Serial No. 95,426.

*To all whom it may concern:*

Be it known that I, JOHN C. SCHLEICHER, a citizen of the United States, residing at Mount Vernon, in the county of Westchester and State of New York, have invented certain new and useful Improvements in Airships; and I do declare the following to be a full, clear, and exact description of the invention, such as will enable others skilled in the art to which it appertains to make and use the same.

My invention relates to heavier than air machines and has for one object to provide a machine which may attain great speed, say two hundred miles an hour or more, and yet so construct the same as to permit the speed to be reduced or to allow the craft to remain at a standstill in the air without danger of falling or disturbing its equilibrium in the least.

A further object is to make provision whereby if the aviator is forced to land in a narrow place on land or water he could fold the wings or planes of the machine and then proceed to an open space at which point the wings could again be spread to permit continuance of flight. This folding of the wings is also of advantage in enabling the machine to be carried in a small space on board a war vessel or other ship and permits the craft to be run into a much smaller hangar than is possible with machines having wings incapable of folding.

An additional object is to protect the occupants of the ship against the elements in severe weather and against the terrific force of the air when traveling at a high speed.

The foregoing objects are attained through the instrumentality of the numerous novel features of construction and combinations of parts hereinafter fully described and claimed, the descriptive matter being supplemented by the accompanying drawings which constitute a part of this application and in which:

Figure 1 is a side elevation of an air ship constructed in accordance with my invention;

Fig. 2 is a top plan view thereof;

Fig. 3 is a central vertical longitudinal sectional view;

Fig. 4 is a vertical transverse section taken on the plane indicated by the line 4—4 of Fig. 3;

Fig. 5 is a detail longitudinal section through one of the supporting wings taken substantially on the plane of the line 5—5 of Fig. 2;

Fig. 6 is an enlarged vertical section through one end of the ship, showing more particularly the mounting of the motor and the controlling means for one of the reversible propellers;

Fig. 7 is a horizontal sectional view taken on the planes indicated by the line 7—7 of Fig. 6; and Fig. 8 is an enlarged sectional view of one of the propellers.

In specifically describing the construction shown in the drawings above briefly described, similar characters will be placed on corresponding parts throughout the several views and reference will be herein made to the numerous elements by their respective indices. To this end, the numeral 1 designates a cigar shaped hull which will preferably be constructed of aluminum although any other preferred material might well be employed, said hull having in its sides a plurality of windows 2 and one or more doors 3 by means of which the occupants may enter. A plurality of pontoons 4 extend beneath the hull 1 and are preferably inclosed in a single casing with upturned ends as depicted clearly in Figs. 1 and 3, the bottom of said casing being provided at suitable points with openings 5 in which a pair of wheels 6 are mounted, these wheels being preferably of hollow formation and so constructed as to permit them to propel the craft on land and to assist the propulsion thereof on water. A third and dirigible wheel 7 is positioned in advance of the wheels 6 and will be constructed in the same manner. The structure of these wheels, however, constitutes no part of the present invention and specific description and illustration thereof is therefore eliminated.

The casing of the pontoons 4 will preferably carry therein a fuel tank 8 which, being at the extreme lower side of the ship, will assist in lowering the center of gravity to prevent lateral tilting. The fuel may be drawn from this tank to the engines in any preferred manner well known in the art.

The hull 1 is provided with a pair of laterally extending wings or planes 9 which preferably incline upwardly and outwardly as shown in Fig. 4. This location of the wings likewise assists in lowering the center of gravity to prevent capsizing of the ship.

Each wing 9 is formed of an inner section 10 rigidly though preferably detachably secured to the hull above the center thereof, the outer ends of said sections being held against vertical vibration by upper and lower guys 11 and 12, the latter being secured to any suitable part of the ship adjacent the lower side thereof while the cables 11 are anchored to the rigid bar 13 of a frame 14 which rises from the hull 1. This frame serves not only as anchoring means for the guys 11 but acts to support the outer sections 15 of the wings when said sections are folded inwardly to the dotted line position shown in Fig. 4.

The sections 15 are hinged at 16 to the outer ends of the sections 10 and are limited in their downward movement by cables or the like 17 secured at one end to the outer ends of said sections 15 and at their other ends to the ridge bar 13. For folding the sections 15 upwardly to permit storage of the machine in a small space, to allow the machine to be moved between rocks, trees or the like or between boats on a body of water, and for again extending said sections and holding them in operative position, upper and lower operating cables 18 and 19 are secured at one end to the outer ends of said sections 15. The cables 18 are trained around pulleys 20 and 21 carried respectively by the frame 14 and hull 1, and are finally wound upon drums 22 disposed within said hull and extending longitudinally thereof throughout the width of the planes 9. The cables 19 pass into the lower part of the hull 1 around pulleys 23 and are also secured to the drums 22. The result of this arrangement is that when the drums 22 are rotated in the proper direction, the cables 18 will be wound while cables 19 are unwound, thereby raising the outer sections of the wings or planes. When, however, said drums are rotated in the opposite direction, the plane sections in question will be again extended.

Any preferred means may be employed for locking the drums 22 against movement when once adjusted, but for the purpose of illustration I have shown spring pressed locking bolts 24 which coöperate with toothed wheels 25 secured to said drums.

The wings 9, although of any preferred construction, are preferably built up in the manner depicted in Figs. 2 and 5, said wings having upper and lower longitudinal ribs 26 and 27 to which they are secured and having transverse bracing ribs 28 secured to the upper side of the ribs 27. For the purpose of preventing unnecessary resistance to the air, thin strips 29 of aluminum or the like are secured over the ribs 28 with their front and rear edges inclined downwardly as shown most clearly in Fig. 5.

Although any appropriate means may be provided for steering the ship from left to right when in air, the outer ends of the planes or wings 9 are preferably equipped with rudders 30 mounted in gaps 31 in said wings. By any preferred means which constitutes no part of the present invention, either one of the rudders 30 may be swung to vertical position, whereupon it will retard the movement of this side of the machine with the result that the other side thereof will turn in the required manner. The rudders 30 also serve to bank the machine the necessary amount in making turns.

Elevating planes 32 are mounted adjacent the sides of the hull 1 near the front and rear ends thereof, said planes being of any suitable construction but being preferably so constructed and mounted as to permit them to be disposed in downwardly converging relation as shown in Fig. 1. This positioning of the planes 32 permits the entire machine to lower slowly in a vertical direction and maintains it in a horizontal position.

The ends of the hull 1 are preferably rounded as shown in Figs. 3 and 6, said ends having vertical slots 33 closed normally by caps 34 contacting slidably with the exterior of said ends. The shafts 35 of front and rear engines 36 project through the slots 33 and are received rotatably in bearings 37 carried by the caps 34, the outer ends of said shafts being equipped with propellers 38 which by means to be described are rendered reversible.

Each engine 36 has projecting laterally therefrom a pair of alined journals 39 mounted for oscillation in bearings 40 secured within the ends of the hull, said journals preferably extending from and being formed integrally with the crank case of the engines. It will be understood, however, that they may be secured in place in any suitable manner. The inner ends of the engines 36 are provided with any preferred type of shoes 41 guided in vertical directions by arcuate tracks 42 secured rigidly within the ends of the hull, said tracks preferably having slots 43 receiving said shoes.

The function of mounting the engines 36 in the manner shown and described is to permit them to be swung vertically to dispose the propellers 38 in upwardly converging relation as shown in dotted lines in Fig. 1. By positioning the propellers in this manner and by reversing the rearmost thereof, the machine may be suspended in midair and by decreasing the speed of said propellers the ship may descend slowly or rapidly as occasion may demand. Any suitable means may be provided for simultaneously tilting the engines 36 in opposite directions but for purposes of illustration I have shown upper and lower cables 44 and 45 secured to the shoes 41 and extending around upper and lower pulleys 46 and 47, said cables being wound on suitable drums 48 operable at will from a hand wheel 49 disposed within easy reach of the aviator's seat which is designated in the drawings by the numeral 50. For holding the drums 48 against rotation when once adjusted, any suitable locking means may be provided, such means being indicated at 51.

The propellers 38 may be constructed in any manner for accomplishing the required results as will be readily understood. However, for the purpose of illustrating one manner in which said propellers may be embodied, attention is directed to Fig. 8. In this figure one of the propellers 38 is shown in detail, the blades 52 thereof being mounted for turning on longitudinal axes between a rim 53 and a hub 54, the latter preferably having inner and outer concentric sleeves 55 and 56 formed integrally at one end with a plate 57. The sleeve 55 is keyed or otherwise secured to the engine shaft 35. The inner ends of the blades 52 are equipped with cranks 58 having studs 59 traveling in a circumferential groove 60 in a collar 61 which is mounted slidably on the sleeve 55. It will thus be seen that as said collar is shifted from one position to another the angles of the blades 52 will be reversed. The collar 61 has formed therein a second circumferential groove 62 receiving a ring or runner 63 on the outer end of a control rod 64 which is adapted to be moved inwardly and outwardly to adjust the collar 61 as occasion may demand.

In the preceding paragraph but one propeller 38 has been described but it is to be understood that the two are constructed in the same manner. The control rods 64 are provided on their inner ends with yokes 65 mounted slidably on certain of the journals 39, said yokes being shown in the present embodiment of the invention as having depending arms 66 to which cables 67 are secured, said cables being wound on drums 68 which will be controlled similarly to the drums 48. When either drum 68 is turned in one direction the two ends of the cable wound on said drum will move in opposite directions with the result that the rods 64 will be shifted inwardly or outwardly as the case may be, reversal of said drum accomplishing the opposite result.

Particular emphasis is laid upon the unique mounting and manner of moving the rods 64 since by this arrangement although the arms 66 must move slightly as the propellers are adjusted vertically, said arms are in such close proximity to the journals 39 as to render their amount of movement so small as to affect in no manner the position of the rods 64.

From the foregoing description, taken in connection with the accompanying drawings, it will be apparent that the objects of the invention have been attained and that I have provided a number of unique features of construction to this end. It is to be understood, however, that although certain specific details have been shown and described for the attainment of probably the best results, numerous changes may be made within the scope of the invention as claimed without sacrificing the main advantages thereof.

I claim:

1. An air ship having front and rear propellers mounted for vertical swinging on transverse journals, one of said propellers having reversible blades, a forwardly and rearwardly movable control member for reversing said blades, said member having an elongated yoke slidable on one of said journals, means for shifting said member forwardly and rearwardly at will, and means for simultaneously swinging both propellers vertically in unison to dispose the same in vertically converging planes.

2. An air ship having front and rear engines, transverse horizontal journals on which said engines are mounted for vertical swinging, front and rear propellers mounted on the shafts of said engines, one of said propellers having reversible blades, a forwardly and rearwardly movable control member for reversing said blades, said member having a yoke slidable on one of said journals, means for shifting said member forwardly and rearwardly at will, and means for swinging both engines vertically in unison to dispose the two propellers in vertically converging planes.

3. An air ship having a propeller mounted for vertical swinging upon transverse journals, said propeller having a plurality of reversible blades, a sliding collar on the propeller shaft for reversing said blades, said collar having formed therein a peripheral groove, a runner mounted loosely in said groove, a longitudinally disposed control rod secured at its outer end to said runner and having its inner end formed with an elongated yoke mounted slidably on one of the aforesaid journals, rigid arms extending laterally from said yoke, and means connected with said arms for moving the yoke in one direction or the other.

In testimony whereof I have hereunto set my hand in presence of two subscribing witnesses.

JOHN C. SCHLEICHER.

Witnesses:
J. A. GRIESBAUER,
L. O. HILTON.